United States Patent [19]

Monnier

[11] Patent Number: 5,062,604
[45] Date of Patent: Nov. 5, 1991

[54] INSTRUMENT DANEL ASSEMBLY FOR MOTOR VEHICLE DASHBOARD

[75] Inventor: Christian Monnier, Pontoise, France

[73] Assignee: Societe d'Applications Generales d'Electricite et de Mecanique Sagem, Paris, France

[21] Appl. No.: 537,334

[22] Filed: Jun. 13, 1990

[30] Foreign Application Priority Data

Jun. 13, 1989 [FR] France .................. 89 07790

[51] Int. Cl.$^5$ .......................................... B60K 37/00
[52] U.S. Cl. .................. 248/27.1; 248/220.2
[58] Field of Search .......... 248/544, 27.1, 27.3, 248/220.2, 309.1; 296/70

[56] References Cited

U.S. PATENT DOCUMENTS 4,920,799  5/1990  Low .................. 248/27.1

FOREIGN PATENT DOCUMENTS 0313739  5/1989  European Pat. Off. .
1229549  3/1960  France .
2219262  12/1989  United Kingdom .

Primary Examiner—Ramon O. Ramirez
Assistant Examiner—Robert A. Olson
Attorney, Agent, or Firm—Rosenman & Colin

[57] ABSTRACT

Motor vehicle dashboard comprising, from the front to the rear, an instrument panel, a raised portion pierced with windows displaying measuring and counting instrument dials, the raised portion receiving a window interposed between it and the instrument panel, the measuring and counting instruments, a case and an electric circuit support. The raised portion comprises, projecting rearward, pins for positioning the instruments which cooperate with complementary holes provided on the instruments. The instruments and the case are fixed respectively to the case and to the raised portion.

7 Claims, 1 Drawing Sheet

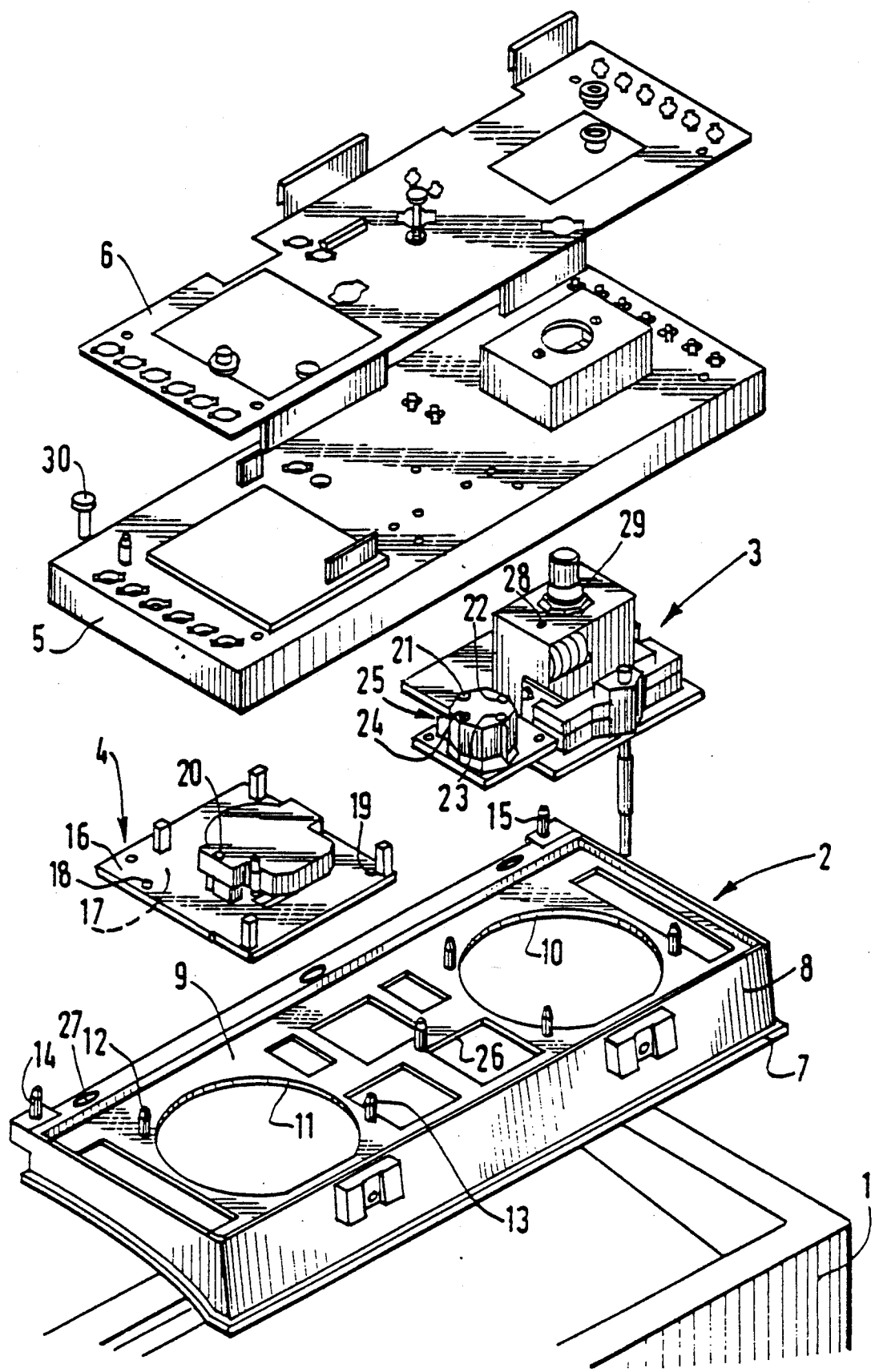

INSTRUMENT DANEL ASSEMBLY FOR MOTOR VEHICLE DASHBOARD

BACKGROUND OF THE INVENTION

1. Field of the Invention

The present invention relates to a motor vehicle dashboard comprising, from the front to the rear, an instrument panel, a raised portion pierced with windows displaying measuring and counting instrument dials, the raised portion receiving a window interposed between it and the instrument panel, the measuring and counting instruments, a case and an electric circuit support, the case being fixed by the rear to the raised portion.

2. Description of the Prior Art

In dashboards assembled and mounted up to now, the case comprises, on its front face, pins for positioning or indexing the instruments and means, tappings or screw threads, for fixing these instruments. Furthermore, the instruments also comprise on their rear face means, tappings or screw threads, for fixing the electric circuit support, cooperating through the case with complementary fixing means for providing the electric connection between the instruments and the circuits of the support.

Dashboards of the prior art generally have two drawbacks.

Firstly, since the instruments are positioned with respect to the case, it may happen that they are not correctly centered with respect to their display windows pierced in the raised portion, which may be likened here to an intermediate frame or case. Secondly, these dashboards require a particularly long fitting time. In fact, the instruments must first of all be fixed by the front to the case before turning the case round and again fixing them by the rear for their electric connection to the circuits on the support.

From the document FR-A-1 229 549, a dashboard is known of a type fairly close to that which is described above. Considering the elements of this dashboard serving, within the meaning of the invention, as window, raised portion, case, instruments, the case is there fixed by the rear to the raised portion. The window is not interposed between an instrument panel and the raised portion, the instruments are not fixed on the case by the rear and the means for positioning the raised portion do not position the instruments but the case. In short, the above mentioned drawbacks still exist.

SUMMARY OF THE INVENTION

The object of the present invention is to overcome these drawbacks.

For this, the present invention relates to a dashboard of the above type, characterized by the fact that the raised portion comprises, projecting rearward, means for positioning the instruments which cooperate with complementary means provided on the instruments and the instruments are fixed by the rear to the case.

In the dashboard of the invention, the instruments are correctly positioned with respect to their display windows. Assembly of the dashboard of the invention, except for the instrument panel, takes place without the need to turn it round. Preferably, the means for positioning the instruments on the raised portion comprise, on the raised portion, pins and, in the instruments, orifices for receiving the pins.

BRIEF DESCRIPTION OF THE DRAWING

The invention will be better understood from the following description of the preferred embodiment of the dashboard of the invention, with reference to the single accompanying figure in which it is shown in an exploded view.

DESCRIPTION OF THE PREFERRED EMBODIMENT

The motor vehicle dashboard, shown in the figure before assembly, comprises from front to rear, i.e. from the inside to the outside of the vehicle, a plate or external frame 1, a raised portion 2, instruments 3, 4, 25, a case 5 and an electric circuit support 6. Plate 1, which is shaped for receiving the raised portion 2, only serves for mounting and assembling the outer parts of the dashboard. Once assembled, the whole of the plate is removed for fixing it to the instrument panel which is thus substituted for the plate! The raised portion 2 is shaped for receiving on its lateral edge 8 a concave window 7, made from transparent and non-glare resin, turned towards the front. The bottom wall 9 of the raised portion is formed with display windows 10, 11, 26 for the instruments 3, 4, 25. Positioning pins, such as 12, 13 for instrument 4, are fixed to the bottom wall 9 projecting rearward. Pins 14, 15 also project rearward from the corners of the bottom wall 9, for centering case 5.

The instruments 3, 4, 25 associated with their respective probes and feelers, not shown, comprise a light duct 16 on the front face 17 of which a film is silk-screen printed forming the dial properly speaking. Ducts 16 and the silk-screen printed films are formed with orifices 18, 19 for receiving the ends of the positioning pins 12, 13 of the raised portion. Tapped holes 20, 21, 22, 23, 24, 28, 29 are formed from the rear face of the instruments for fixing them by the rear to case 5. Tapped holes 27 are formed from the rear face of the bottom wall 9 of the raised portion 2 for fixing the case 5 to the latter by screws 30.

The dashboard can be assembled simply and rapidly in a production line, as described hereafter.

The raised portion 2 is positioned in plate 1, with the window 7 turned towards the latter. Then instruments 3, 4, 25 are positioned on the raised portion 2 by engaging the orifices 18, 19 on the positioning pins 12, 13 of the raised portion 2. Then case 5 is positioned, to which support 6 has been fixed, on the centering pins 14, 15 of the raised portion 2. Screws, not shown, are screwed at the rear of case 5 therethrough into &:he tapped holes 20-24, 28, 29 of the instruments for fixing them to the case and screws 30 are screwed through case 5, into the tapped holes 27 of the raised portion 2, for fixing case 5 to the raised portion 2.

Naturally, the above mentioned notions of threading, tapping and screwing should only be considered in their relativity.

Assembly of the dashboard is achieved without the need to turn it round and the instruments 3, 4, 25 are perfectly positioned and immobilized between case 5 and the raised portion 2 between which they provide a spacer function. It is then sufficient, as mentioned above, to remove the assembly, formed of the raised portion, the instruments, the case and the electric circuit support, from the plate and fix it to the instrument panel of the vehicle.

What is claimed is:

1. An instrument panel assembly for a motor vehicle dashboard, comprising:
   (a) a housing having a front window and a rear wall overlying and spaced from the front window, said rear wall having a plurality of display openings;
   (b) a plurality of dashboard instruments, each having a dial face;
   (c) means for precisely positioning the instruments on the rear wall of the housing, and for aligning a respective dial face with a respective display opening;
   (d) a casing having a back wall;
   (e) means for connecting the instruments to the back wall of the casing; and
   (f) means for fixedly securing the casing with the instruments connected thereon to the housing, and for enclosing the instruments between the back wall of the casing and the rear wall of the housing.

2. The instrument panel assembly according to claim 1, wherein the positioning means includes a set of projections extending generally normal to the rear wall of the housing, and a set of holes on each instrument, each hole receiving a respective projection.

3. The instrument panel assembly according to claim 1, wherein the housing has peripheral side walls, and wherein the casing has peripheral border walls that fit inside the side walls of the housing when the casing is secured to the housing.

4. The instrument panel assembly according to claim 1, and further comprising centering means for precisely centering the casing with the instruments connected thereon to the housing prior to fixedly securing the casing to the housing.

5. The instrument panel assembly according to claim 4, wherein the centering means includes a set of protrusions extending generally normal to the rear wall of the housing, and a set of orifices on the casing, each orifice receiving a respective protrusion.

6. The instrument panel assembly according to claim 1, and further comprising an electrical circuit support mounted on the back wall of the casing.

7. The instrument panel assembly according to claim 6, and further comprising an assembly frame for holding the housing, the instruments, the casing and the electrical circuit support in an assembled relationship prior to mounting on the motor vehicle dashboard.

* * * * *